W. H. FORKER.
FLUE-CUTTER.
No. 175,685. Patented April 4, 1876.
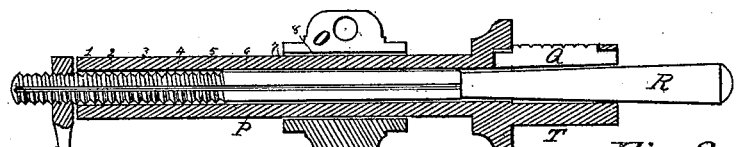
Fig. 1.
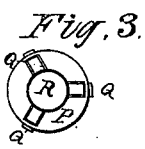
Fig. 3.
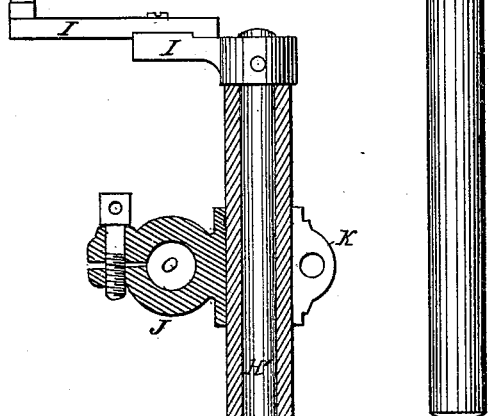
Fig. 2.
Fig. 4.
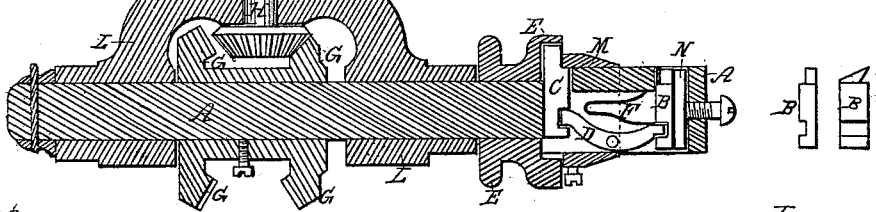
Witnesses. Inventor.

UNITED STATES PATENT OFFICE.

WILLIAM H. FORKER, OF MEADVILLE, PENNSYLVANIA.

IMPROVEMENT IN FLUE-CUTTERS.

Specification forming part of Letters Patent No. 175,685, dated April 4, 1876; application filed July 12, 1875.

*To all whom it may concern:*

Be it known that I, WILLIAM H. FORKER, of Meadville, Crawford county, Pennsylvania, have invented a Flue-Cutter, of which the following is a specification:

The object of my invention is to cut flues, (that from defect, or otherwise, have to be removed,) while still in position in the boiler, with as clean a revolving cut as though done in a lathe, and to make the cut either close inside the crown-sheet, or at any point farther in, as may be desired, or to cut the flues on the outside the crown-sheet after being spliced and replaced and thus save the labor of taking them out after being marked to cut them in the lathe. It will also obviate the necessity of cutting them in the lathe before splicing, as well as a great saving in the flues themselves, which are ordinarily split for some distance at each end when taken out in the usual manner.

Figure 1 is the holder or fulcrum. The hollow bar P is slotted for two or three inches at one end in three or more places. (See end view, Fig. 3.) Into these slots the pieces Q are fitted loose, resting on the flared end of the rod R, having a taper to correspond with the end of the rod, so that the outer edges will be parallel. When bar P is placed in the flue, the rod is drawn through by handle S, operating a nut on the screw end of rod R, till the bits Q are firmly wedged, thus planting the bar P rigidly to the end of the boiler. The bar O has a clamp-sleeve at one end, by which it can be fixed at any point on the scale marked on the bar P, or fixed at any point of a circle round bar P.

Fig. 2 is the flue-cutter proper. The shaft A has two bevel-gear wheels in one piece, G G, to be shifted to either side of the pinion H, so that the direction of the crank can be changed without changing the direction of cutting-tool. Working loose on shaft A is a female eccentric, E, (see also Fig. 4,) which, operating on the notched slide C, forces down one end of the lever D, and forcing up the cutting-tool at the other end, while the tool is cutting. A mortise is made near the end of the shaft A, wide enough so that the notch in cutter B can be hooked over the lever D, and then kept in position by the parallel key N, with a hole part way through it for the screw that comes through the end of shaft A, and is thus prevented from slipping up and down with cutter B. When eccentric E is reversed, the spring F forces the cutter B back into its recess. There is a tapered collar, M, that slips over the end of the cutter-shaft, and can be adjusted and fixed by a set-screw, so as to steady the tool, and give an even cut in different-sized flues. The crank I, that turns the shaft H' and pinion H, is made in two pieces, with a slot in the longest piece, and can be varied and fixed at the desired length by the set-screw. The frame L, which makes the bearing for both the pinion-shaft and the cutter-shaft, is turned with true parallel sides, the length of the stem, so as to slide easily through clamp-sleeve K. (See Figs. 1 and 2.) The double expansion right-angled clamp-sleeves J and K make a connection, the bar O passing through clamp J, and the stem of frame L through clamp K, both being clamped tight at any point of their lengths.

Operation: When the stem of frame L and the bar O are fixed at right angles with the clamps J and K, the clamp on the end of bar O round the hollow bar P is loosened, and the bar P is slipped into a flue and fastened therein by expansion. Then, the clamps J and K being loose, the cutter-bar may be introduced into any flue round bar P within reach of the stem of frame L and the bar O. The depth of the cutter in the flue is shown by the scale on bar P. Then all the clamps are screwed tight, when, the cutter being revolved by the crank, the cutter is fed to its work by turning the eccentric E until the flue is cut through, the cutter having been held centrally in the flue by the adjustable tapered ring M. When all the flues around the central holder are cut that are within reach, then the bar P is fixed in a new position, and so on. Now, as the crank-shaft is at right angles with the cutter-shaft, I am able to cut flues close up to the fire-box or breeching, either at the sides, top, or bottom, and not interfere with the working of the crank, which can all the while be out toward the center of the crown-sheet; but as the cutter must always turn in one direction when cutting in order to get a natural motion of the hand with the crank, which has to be reversed as relates to the operator, when the cutter is thrown from one side to the other of the holder P, I shift the pinion from one wheel to the other to accommodate this movement of the hand.

I claim—

1. The combination of the shaft A, cutter B, slide C, lever D, key N, eccentric E, spring F, and collar M, constructed and operated as described, and for the purpose set forth.

2. The combination of the right-angled clamp-sleeves J and K with the frame L and bar O, and with the clamp-sleeve on bar O and the bar P, the whole being constructed as described, and for the purpose set forth.

WM. H. FORKER.

Witnesses:
J. N. McCLOSKEY,
JNO. D. CLEMSON.